United States Patent
Ko et al.

(10) Patent No.: US 7,889,306 B1
(45) Date of Patent: Feb. 15, 2011

(54) LIQUID CRYSTAL DISPLAY AND FABRICATION METHOD THEREOF

(75) Inventors: Tae Wun Ko, Seoul (KR); Sung Il Park, Anyang-shi (KR); Dong Yeung Kwak, Daeku-shi (KR); Gun Hee Lee, Kumi-shi (KR); Kwang Sup Park, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 09/573,572

(22) Filed: May 19, 2000

(30) Foreign Application Priority Data

May 21, 1999 (KR) ................................. 1999-18567
Jul. 14, 1999 (KR) ................................. 1999-28572

(51) Int. Cl.
*G02F 1/1339* (2006.01)
(52) U.S. Cl. ........................................ 349/153; 349/190
(58) Field of Classification Search ................. 349/153, 349/190, 138
See application file for complete search history.

(56) References Cited

U.S. PATENT DOCUMENTS

| | | | | |
|---|---|---|---|---|
| 5,155,612 | A * | 10/1992 | Adachi et al. ................ | 349/111 |
| 5,379,139 | A * | 1/1995 | Sato et al. .................... | 349/155 |
| 6,011,608 | A * | 1/2000 | Tanaka ........................ | 349/153 |
| 6,124,917 | A | 9/2000 | Fujioka et al. | |
| 6,191,841 | B1 * | 2/2001 | Ootaguro et al. ............. | 349/190 |
| 6,238,754 | B1 * | 5/2001 | Shohara et al. .............. | 428/1.5 |
| 6,337,520 | B1 | 1/2002 | Jeong et al. | |
| 6,417,898 | B1 * | 7/2002 | Izumi ........................... | 349/73 |
| 6,587,160 | B2 * | 7/2003 | Lee et al. ..................... | 349/40 |
| 6,970,212 | B1 * | 11/2005 | Gomi .......................... | 349/95 |
| 2001/0048502 | A1 * | 12/2001 | Moon et al. .................. | 349/153 |
| 2004/0141116 | A1 * | 7/2004 | You ............................. | 349/113 |
| 2008/0297714 | A1 * | 12/2008 | Yanagawa et al. ........... | 349/153 |

FOREIGN PATENT DOCUMENTS

| | | |
|---|---|---|
| DE | 198 14 676 | 10/1997 |
| DE | 197 14 510 | 11/1997 |
| EP | 0 455 233 | 6/1991 |

(Continued)

OTHER PUBLICATIONS

Search Report Issued Nov. 16, 2004.

(Continued)

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A liquid crystal display and a method of fabricating the same is capable of strengthening adhesion between a sealant and a lower plate in a panel with a high aperture ratio to which an organic protective film is applied. The organic protective film and a gate insulating film are patterned in such a manner that the sealant comes into contact with a substrate directly. Accordingly, the organic protective film or the gate insulating film at the area coated with the sealant is partially or entirely removed to directly contact the sealant with the gate insulating film or the lower glass, thereby strengthening the adhesion between the sealant and the lower plate.

12 Claims, 21 Drawing Sheets

FOREIGN PATENT DOCUMENTS

| | | |
|---|---|---|
| EP | 0 731 373 | 9/1996 |
| JP | 01-281429 | 11/1989 |
| JP | 01-283515 | 11/1989 |
| JP | 10-186381 | 12/1996 |
| JP | 9-33933 | 2/1997 |
| JP | 09-043616 | 2/1997 |
| JP | 10-48611 | 2/1998 |
| JP | 10-111515 | 4/1998 |
| JP | 10-206862 | 8/1998 |
| JP | 10-240150 | 9/1998 |
| JP | 10-253991 | 9/1998 |
| JP | 10-253992 | 9/1998 |
| JP | 10-325967 | 12/1998 |

OTHER PUBLICATIONS 2000-150687, Search Report Issued Oct. 29, 2002.

Search Report dated Jul. 14, 2000.

* cited by examiner

LIQUID CRYSTAL DISPLAY AND FABRICATION METHOD THEREOF

This application claims the benefit of Korean Patent Application Nos. 1999-18567 and 1999-28572, filed on May 21, 1999 and Jul. 14, 1999, respectively, which are hereby incorporated by reference for all purposes as if fully set forth herein.

BACKGROUND OF THE INVENTION

1. Field of the Invention

The present invention relates to a liquid crystal display device, and more particularly to a liquid crystal display which is capable of strengthening adhesion between the upper and lower plates of a panel with a high aperture ratio to which and organic protective film is applied, and a fabrication method thereof.

2. Discussion of the Related Art

Generally, a liquid crystal display (LCD) controls the light transmissivity in accordance with video signals by liquid crystal cells arranged in a matrix pattern to thereby display a picture corresponding to the video signals on a liquid crystal panel. To this end, the LCD includes a liquid crystal panel having liquid crystal cells arranged in an active matrix type, and driving integrated circuits (ICs) for driving the liquid crystal cells. The ICs are usually manufactured in the chip type, and mounted on a tape carrier package in the case of a tape automated bonding (TAB) system, or mounted on the surface of the liquid crystal panel in the case of a chips on glass (COG) system. In the case of a TAB system, the driving ICs are electrically connected, via the TCP, to a pad provided on the liquid crystal panel.

FIG. 1 shows a plan view of a liquid crystal panel 2 having the structure of oppositely adhering a lower plate 4 to an upper plate 6. Referring to FIG. 1, the liquid crystal panel 2 includes a picture display part 8 having liquid crystal cells arranged in a matrix pattern, gate pads 12 and data pads 14 connected to gate lines and data lines of the picture display part 8, respectively. In the picture display part 8, the data lines supplied with video signals are intersected with gate lines supplied with a scanning signal, that is, a gate signal at the lower plate 4. At the intersections, thin film transistors for switching the liquid crystal cells and pixel electrodes connected to the thin film transistors to drive the liquid crystal cells are provided. Color filters coated separately for each area by a black matrix and a common transparent electrode, which is a counterpart of the pixel electrode, are provided at the upper plate 6. The lower plate 4 and the upper plate 6 having the configuration as described above are spaced apart by a spacer and include a cell gap inside thereof. The cell gap is filled with a liquid crystal material. The lower plate 4 is adhered to the upper plate 6 by a sealant coated on the seal 10 positioned at the outside of the picture display part 8. The gate pad 12 and the data pad 14 are located at the edge of the lower plate 4 which is not overlapped with the upper plate 6. The gate pad 12 applies gate signals applied from the gate driving ICs to the gate lines of the picture display part 8. The data pad 14 applies video signals applied from the data driving ICs to the data lines of the picture display part 8.

A protective film for protecting the metal electrodes and the thin film transistors is entirely coated on the lower plate 4. The pixel electrodes are formed on the protective film for each cell area. An inorganic material such as $SiN_x$ or $SiO_x$ has been conventionally used as the protective film. Since the inorganic protective film has a high dielectric constant and is formed by a vapor deposition technique, it has a drawback in that it is difficult to increase the height thereof. Accordingly, the pixel electrodes and the data lines having the inorganic film therebetween must keep a constant horizontal interval of, for example, 3 to 5 μm so as to minimize a coupling effect caused by a parasitic capacitor. As a result, the size of pixel electrodes having an influence on the aperture ratio of the liquid crystal cell is decreased to have a low aperture ratio. In order to solve this problem, an organic material with a relatively low dielectric constant has been used as the protective film recently. Since this organic protective film has a low dielectric constant of about 2.7 and is formed by a spin coating method, it has an advantage in that it can be formed to a desired height or thickness. Such an organic protective film minimizes a capacitance value of the parasitic capacitor, so that the pixel electrode can be overlapped with the data lines without any horizontal interval therebetween. As a result, the size of pixel electrodes is enlarged to improve the aperture ratio.

When the lower and upper plates of the liquid crystal display with such a high aperture ratio are adhered with a sealant, the sealant usually contacts the organic protective film of the lower plate. However, the organic protective film has a weak adhesive characteristic with respect to a sealant such as epoxy resin. Also, the organic protective film has a weak adhesive characteristic with respect to a gate insulating film positioned at the lower part thereof. Due to this, when the strength of the organic protective film itself is weak, or an adhesion between the organic protective film and the sealant or the gate insulating film is poor, a crack or a layer separation phenomenon is caused by a minute impact at the poor adhesive part. As a result, there is a problem in that liquid crystal is leaked through a poor adhesive part between the sealant and the gate insulating film of the lower and upper portions of the organic protective film. Hereinafter, the problem in the conventional liquid crystal display will be described in detail with reference to the accompanying drawings.

FIG. 2 is an enlarged view of a part of a data link crossed by the seal in FIG. 1. In FIG. 2, the data link 16 is a connecting part between the data pad 14 and the data line of the picture display part and is formed along with the data pad 14 and the data line. A semiconductor pattern 18 is extended into the data pad 14 at the lower portion of the data link 16. The seal 10 coated with a sealant is located in a direction crossing the data link 16. The data pad 14 contacts a transparent film 17 formed on the organic protective film through a contact hole defined in the organic protective film. The transparent film 17 is responsible for protecting the data pad, formed as a metal electrode, and for preventing oxidation of the metal electrode during the repetition of a TCP adhesion required for the TAB process.

FIG. 3A shows a section of the seal 10 in FIG. 2 taken along line A-A', and FIG. 3B shows a section of the seal 10 taken along line B-B'. In FIGS. 3A and 3B, the lower plate 4 has such a structure that a gate insulating film 22, a semiconductor pattern 18 and a data link 16 are sequentially disposed on a lower glass 20 and an organic protective film 24 is entirely coated thereon. In FIG. 3B, a liquid crystal 32 of the picture display part has been injected into the right side of a sealant 11. The upper plate 6 has a structure such that a color filter and a black matrix 26 are formed on an upper glass 30 and a common transparent electrode is entirely coated thereon. The lower plate 4 is adhered to the upper plate 6 with the sealant 11. In this case, the sealant 11 is adhered to the organic protective film 24, thereby providing weak adhesion. Also, the organic protective film 24 has a weak adhesion to the gate insulating film 22 at the lower portion thereof. There is a problem in that, when the adhesion between the organic protective film 24 and the sealant 11 or the gate insulating film 22 is weak, a crack is caused by a minute impact to leak a liquid crystal.

FIG. 4 is an enlarged view of a part of a gate link crossed by the seal in FIG. 1. In FIG. 4, the gate link 34 is a connecting part between the gate pad 12 and the gate line of the picture display part and are formed along with the gate pad 12 and the gate line. The gate pad 12 contacts a transparent film 17 formed on the organic protective film through a contact hole 19 formed by way of the gate insulating film and the organic protective film. The transparent film 17 is responsible for protecting a metal electrode as the gate pad. The seal 10 coated with a sealant is located in a direction crossing the gate link 34.

FIG. 5A shows a section of the seal 10 in FIG. 4 taken along line A-A', and FIG. 5B shows a section of the seal 10 taken along line B-B'. In FIGS. 5A and 5B, the lower plate 4 has a structure such that the gate link 34 and a gate insulating film 22 are sequentially disposed on a lower glass 20 and an organic protective film 24 is entirely coated thereon. The upper plate 6 has such a structure that a color filter and a black matrix 26 are formed on an upper glass 30 and a common transparent electrode is entirely coated thereon. The lower plate 4 is adhered to the upper plate 6 with the sealant 11. In this case, the sealant 11 is adhered to the organic protective film 24, thereby providing a weak adhesion. Also, the organic protective film 24 has a weak adhesion to the gate insulating film 22 at the lower portion thereof. There is a problem in that, when adhesion between the organic protective film 24 and the sealant 11 or the gate insulating film 22 is weak, a crack is caused by a minute impact to leak liquid crystal material.

As a result, since a liquid crystal display with a high aperture ratio to which the conventional organic protective film is applied has a weak adhesion characteristic between the organic protective film and the sealant or the gate insulating film, there is a problem in that a crack is easily caused by a slight exterior impact and hence liquid crystal is leaked through the crack.

SUMMARY OF THE INVENTION

Accordingly, the present invention is directed to a liquid crystal display and a fabrication method thereof that substantially obviate one or more of the problems due to limitations and disadvantages of the related art.

An object of the present invention is to provide a liquid crystal display apparatus having such a structure that can strengthen adhesion between a sealant and a lower plate in a liquid crystal display with a high aperture ratio to which an organic protective film is applied.

Another object of the present invention is to provide a method of fabricating a liquid crystal display that can strengthen adhesion between a sealant and a lower plate in a liquid crystal display with a high aperture ratio to which an organic protective film is applied.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display according to one aspect of the present invention includes an organic protective film and a gate insulating film patterned in such a manner that a sealant comes into contact with a substrate directly.

In another aspect of the present invention, a liquid crystal display includes an organic protective film patterned in such a manner that a sealant comes into contact with a gate insulating film directly.

According to still another aspect of the present invention, a method of fabricating a liquid crystal display includes the step of patterning an organic protective film and a gate insulating film at an area coated with a sealant in such a manner that the sealant comes into contact with a substrate directly.

According to still another aspect of the present invention, a method of fabricating a liquid crystal display includes the step of patterning an organic protective film at an area coated with a sealant in such a manner that the sealant comes into contact with a gate insulating film directly.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, examples of which is illustrated in the accompanying drawings.

Figure 1:
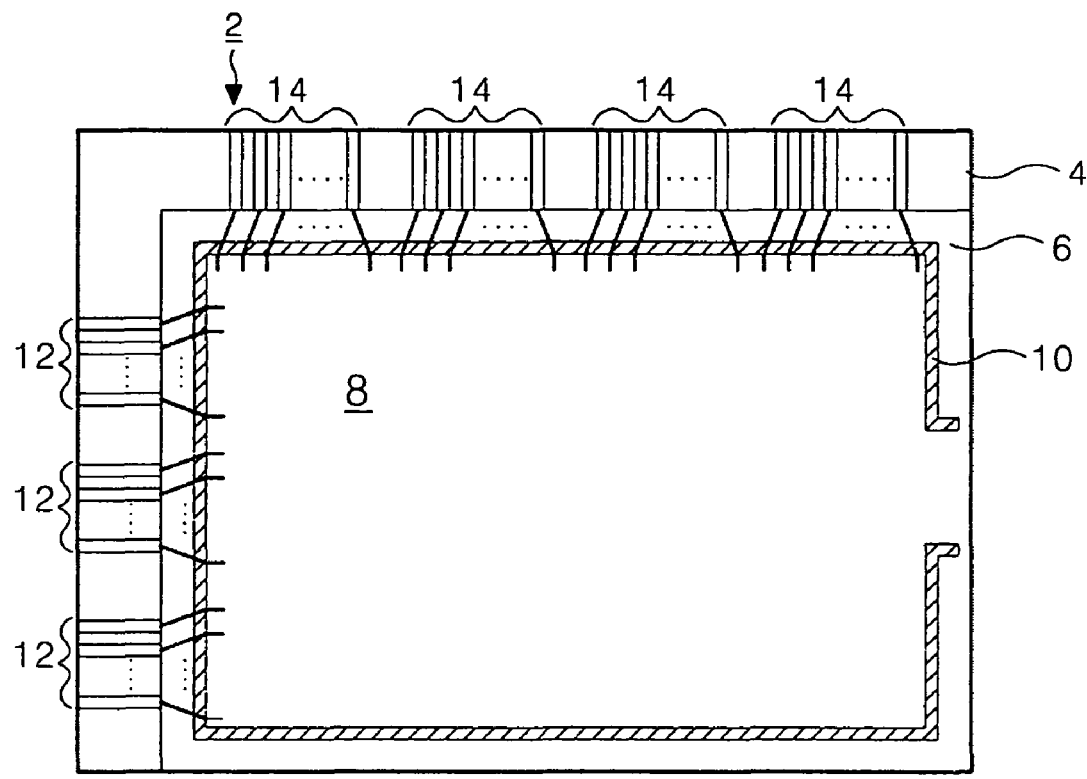
FIG. 1 is a plan view showing a conventional liquid crystal panel.
Figure 2:
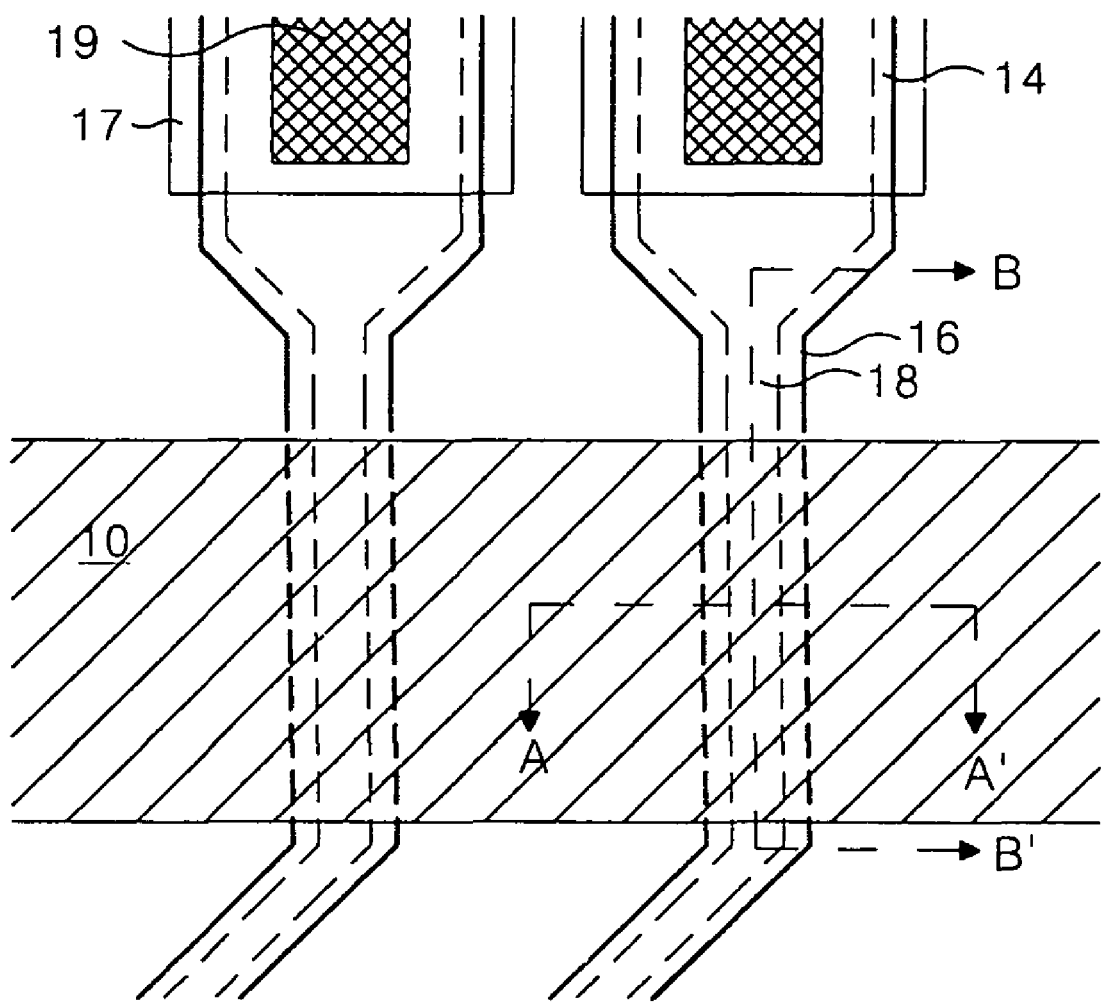
FIG. 2 is an enlarged plan view of a portion of the data link crossing with the seal in FIG. 1.
Figure 3A:
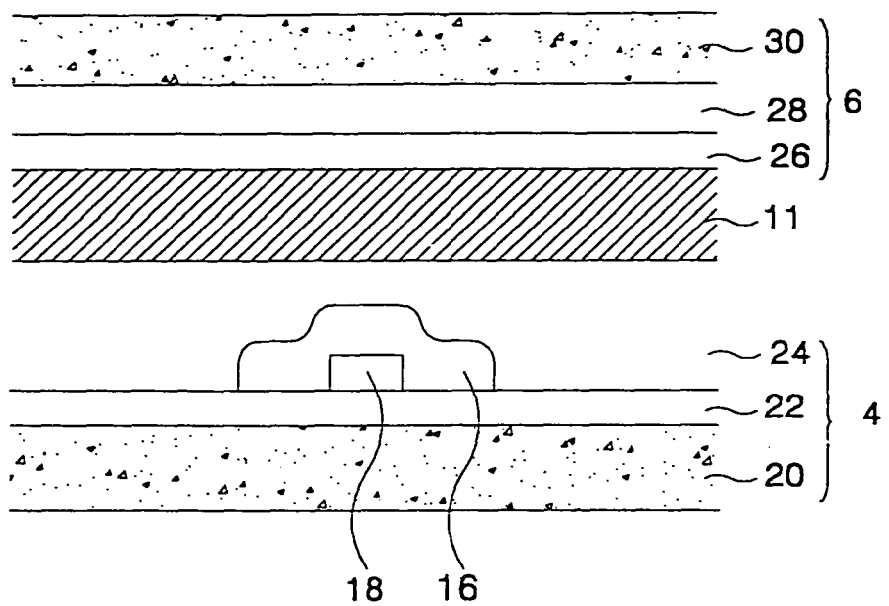
FIG. 3A is a vertical section view of the seal taken along A-A' line in FIG. 2.
Figure 3B:
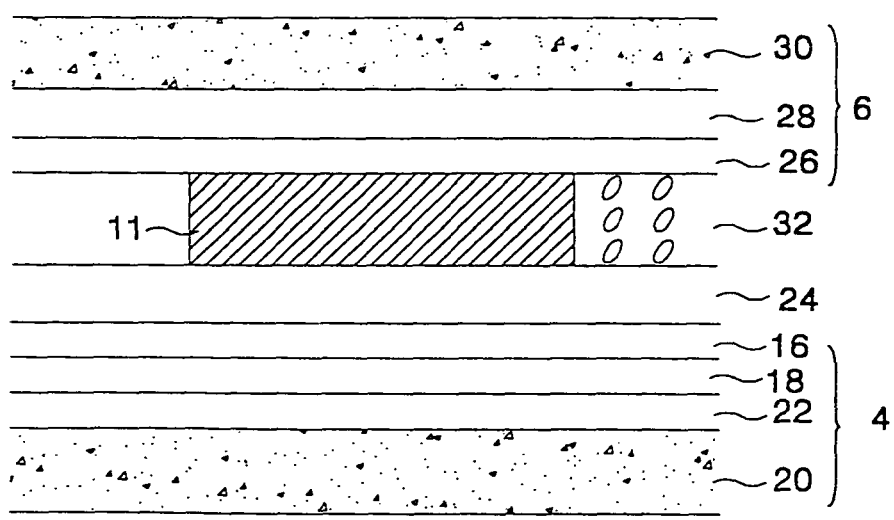
FIG. 3B is a vertical section view of the seal taken along B-B' line in FIG. 2.
Figure 4:
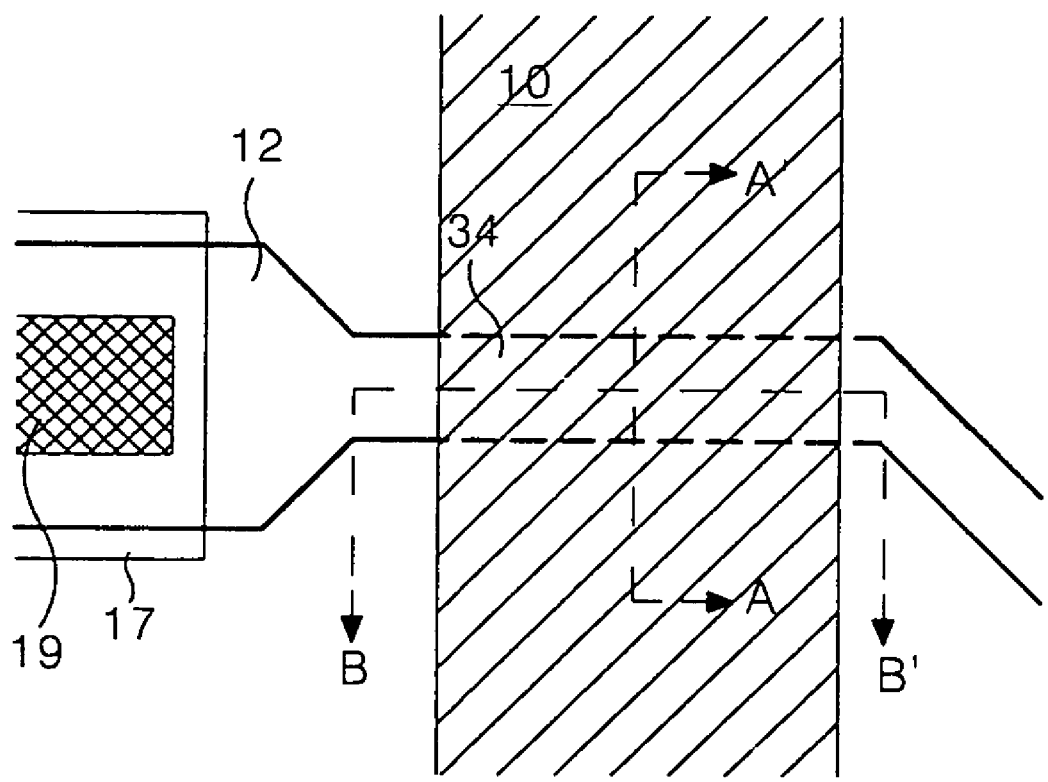
FIG. 4 is an enlarged plan view of a portion of the gate link crossing with the seal in FIG. 1.
Figure 5A:
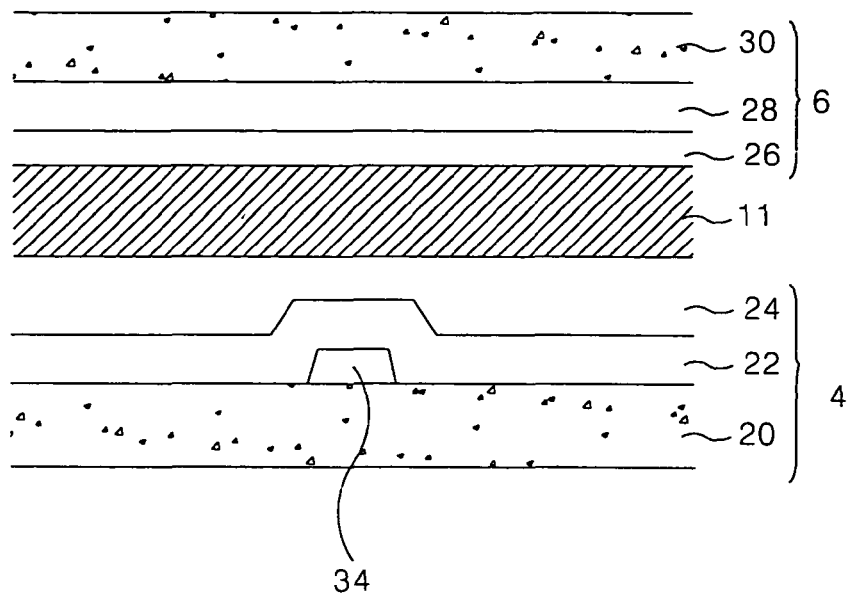
FIG. 5A is a section view of the seal taken along line A-A' in FIG. 4.
Figure 5B:
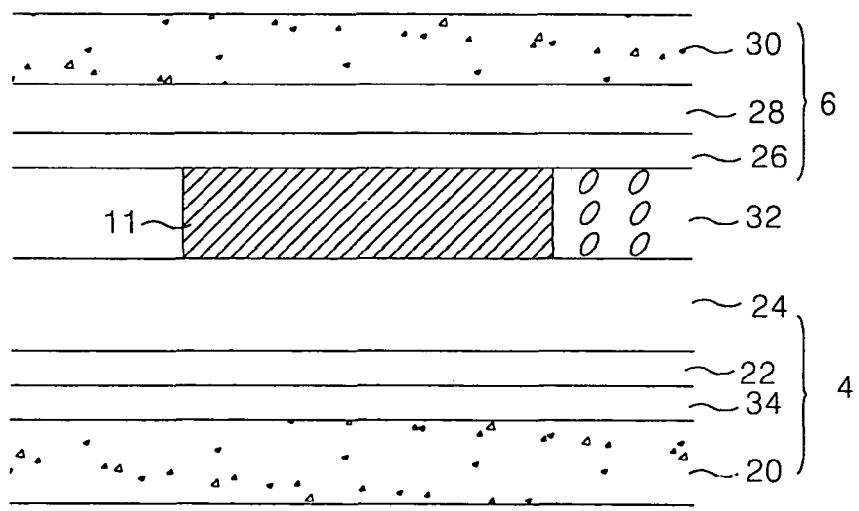
FIG. 5B is a section view of the seal taken along line B-B' in FIG. 4.
Figure 6:
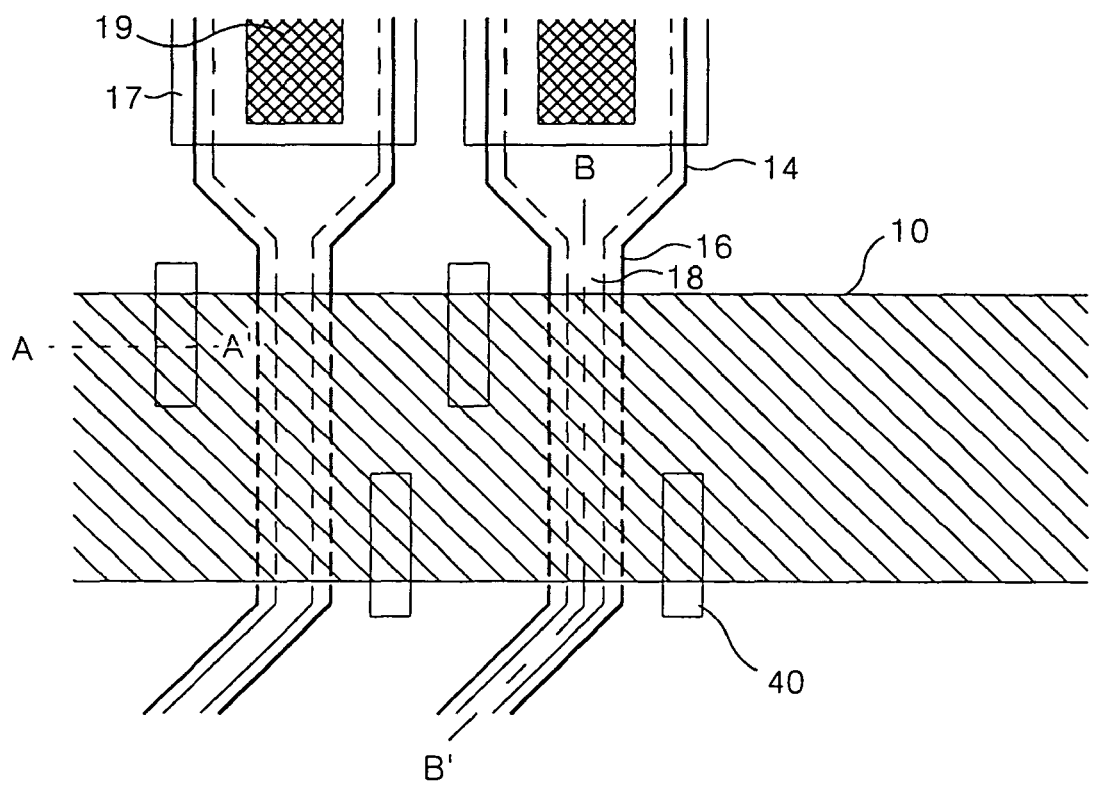
FIG. 6 is a partially enlarged plan view of a data link of a liquid crystal display according to a first embodiment of the present invention.

FIG. 6 is a partially enlarged view of a data link of a liquid crystal display according to a first embodiment of the present invention. In FIG. 6, the data link 16 is formed along with a data pad 14 and a data line of a picture display part. The data pad 14 is electrically connected, via a contact hole 19 defined at an organic protective film, to a transparent film 17. A semiconductor pattern 18 is extended into the data pad 14 at the lower portion of the data link 16. A seal 10 coated with a sealant is positioned in a direction crossing the data link 16. The organic protective film and the gate insulating film positioned at the seal 10 between the data links 16 are patterned by a dry etching technique utilizing a mask pattern to form a number of holes 40, thereby allowing the sealant to partially contact a lower glass directly through the holes 40. Particularly, the holes 40 are extended into the outside of the seal 10, thereby preventing a bubble from being generated at the time of coating the sealant.

Figure 7:
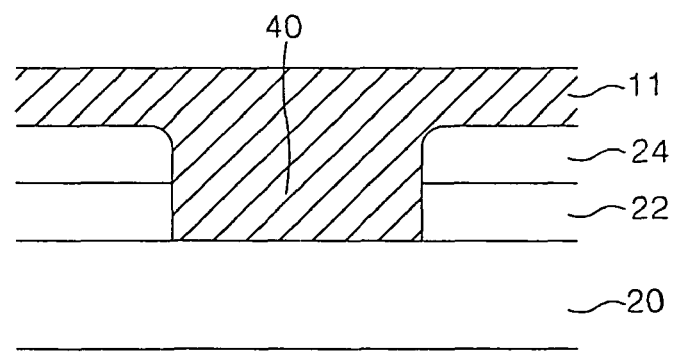
FIG. 7 is a section view of the lower plate and the seal taken along line A-A' in FIG. 6.

FIG. 7 shows a section of the lower plate in which the seal 10 defined with the hole 40 is taken along line A-A' in FIG. 6. A method of fabricating a data link according to a first embodiment of the present invention will be described with reference to FIG. 6 and FIG. 7 below. A gate insulating film 22 is formed on the entire surface of a lower glass 20. After the semiconductor pattern 18 and the data link 16 are sequentially formed on the gate insulating layer 22, an organic protective film 24 is formed on the entire surface thereof. Then, the organic protective film 24 and the gate insulating film 22 at a position to be coated with a sealant 11 are sequentially patterned to form the holes 40. In this case, one end of the hole 40 is positioned at the outside of the seal 10. Subsequently, the seal 10 is coated with the sealant 11 to adhere the upper plate to the lower plate. In this case, the sealant 11 partially contacts the lower glass 20 directly through the hole 40, thereby strengthening the adhesion between the sealant 11 and the lower plate.

Figure 8:
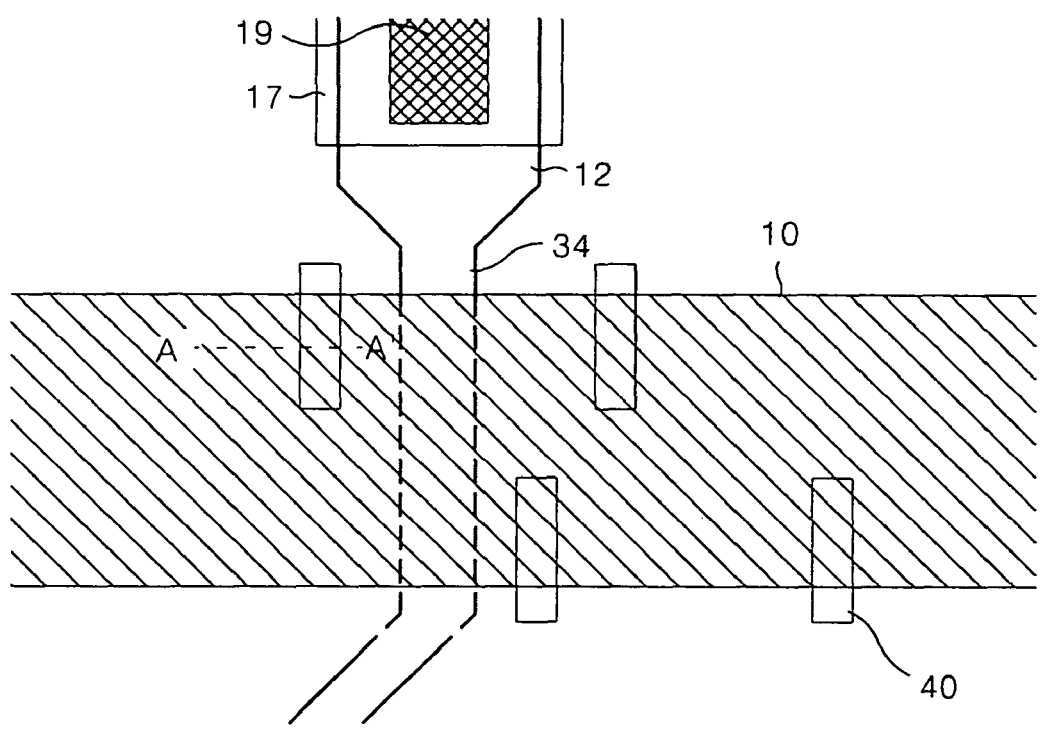
FIG. 8 is a partially enlarged plan view of a gate link of a liquid crystal display according to a first embodiment of the present invention.

FIG. 8 is a partially enlarged view of a gate link of the liquid crystal display according to a first embodiment of the present invention. In FIG. 8, the gate link 34 is formed along with a gate pad 12 and a gate line of a picture display part. The gate pad 12 is electrically connected, via a contact hole 19 formed by way of the gate insulating film and the organic protective film, to a transparent electrode 17. A seal 10 coated with a sealant is positioned in a direction crossing the gate link 34. The organic protective film and the gate insulating film positioned at the seal 10 between the gate links 34 are patterned to form a number of holes 40 in similarity to the data link as mentioned above, thereby allowing a sealant to partially contact a lower glass directly through the holes 40. Particularly, the holes 40 are extended into the outside of the seal 10, thereby preventing a bubble from being generated at the time of coating the sealant.

A section of the lower plate in which the seal 10 defined with the hole 40 is taken along line A-A' in FIG. 8, similarly to FIG. 7. A method of fabricating a gate link according to a first embodiment of the present invention will be described with reference to FIG. 7 and FIG. 8 below. The gate link 34 is formed on the lower glass and a gate insulating layer 22 is formed on the entire surface thereof. After the organic protective film 24 is formed on the entire surface of the gate insulating film 22, the organic protective film 24 and the gate insulating film 22 at a position to be coated with a sealant 11 are sequentially patterned by a dry etching technique utilizing a mask pattern to form the holes 40. In this case, one end of the hole 40 is positioned at the outside of the seal 10. Subsequently, the seal 10 is coated with the sealant 11 to adhere the upper plate to the lower plate. In this case, the sealant 11 partially contacts the lower glass 20 directly through the hole 40, thereby strengthening the adhesion between the sealant 11 and the lower plate.

Figure 9:
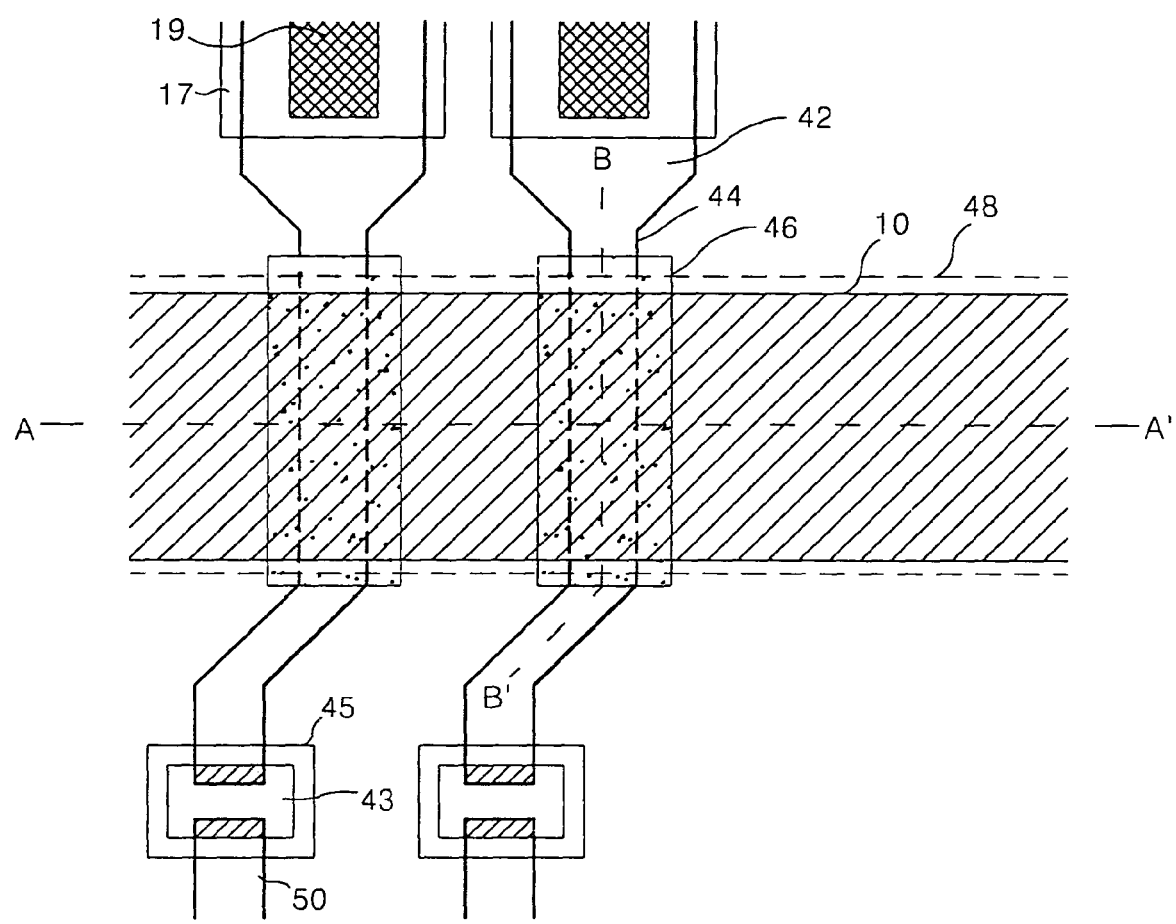
FIG. 9 is a partially enlarged plan view of a data link of a liquid crystal display according to a second embodiment of the present invention.

FIG. 9 is a partially enlarged view of a data link of a liquid crystal display according to a second embodiment of the present invention. In FIG. 9, the data link 44 and a data pad 42 are formed simultaneously using the same metal material as a gate line at the time of forming the gate line. The data link 44 is electrically connected, via a transparent electrode 45 defined in a contact hole 43, to a data line 50 formed at another layer. In other words, the data line 50 formed on a gate insulating film is electrically connected, via the transparent electrode 17 defined in the contact hole 19, to the data link 44 formed at the lower portion of the gate insulating film. A semiconductor pattern 46 is positioned on the data link 44 crossing with a seal 10. The gate insulating film, except for an organic protective film of the seal 10 and a portion formed with the semiconductor pattern 46, is etched to thereby adhere the sealant to the semiconductor pattern 46 and the lower glass. In this case, as an area at which the sealant is adhered to the lower glass becomes enlarged, adhesion between the sealant and the lower plate is strengthened. Particularly, a width of the area 48 at which the organic protective film and the gate insulating film are etched, is set to be larger than that of the seal 10, thereby preventing a bubble from being generated at the time of coating the sealant.

Figure 10:
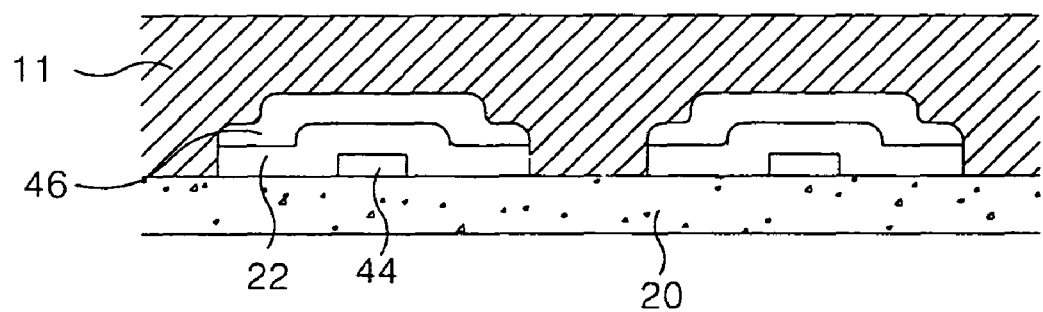
FIG. 10 is a section view of the lower plate and the seal taken along line A-A' in FIG. 9.

FIG. 10 shows a section of the lower plate in which the seal 10 is taken along line A-A' in FIG. 9. A method of fabricating a data link according to a second embodiment of the present invention will be described with reference to FIG. 10 below.

After the data link 44 was formed on the lower glass 20, the gate insulating layer 22 is entirely coated thereon. Then, the gate insulating layer 22, except for a portion formed with the organic protective film of the seal and the semiconductor pattern 46, is etched by means of a mask pattern. In this case, a width of the area 48 at which the organic protective film and the gate insulating film are etched is set to be larger than that of the seal 10. The semiconductor pattern 46 acts as an etch stopper at the time of etching the gate insulating film to protect the gate insulating film 22 and the data link 44 under it. To this end, a width of the semiconductor pattern 46 is set to be wider than that of the data link 44. Then, the seal 10 is coated with a sealant 11 to adhere the upper plate to the lower plate. In this case, the sealant 11 contacts the lower glass 20 and the semiconductor pattern 46 to strengthen the adhesion between the sealant 11 and the lower plate.

Figure 11:
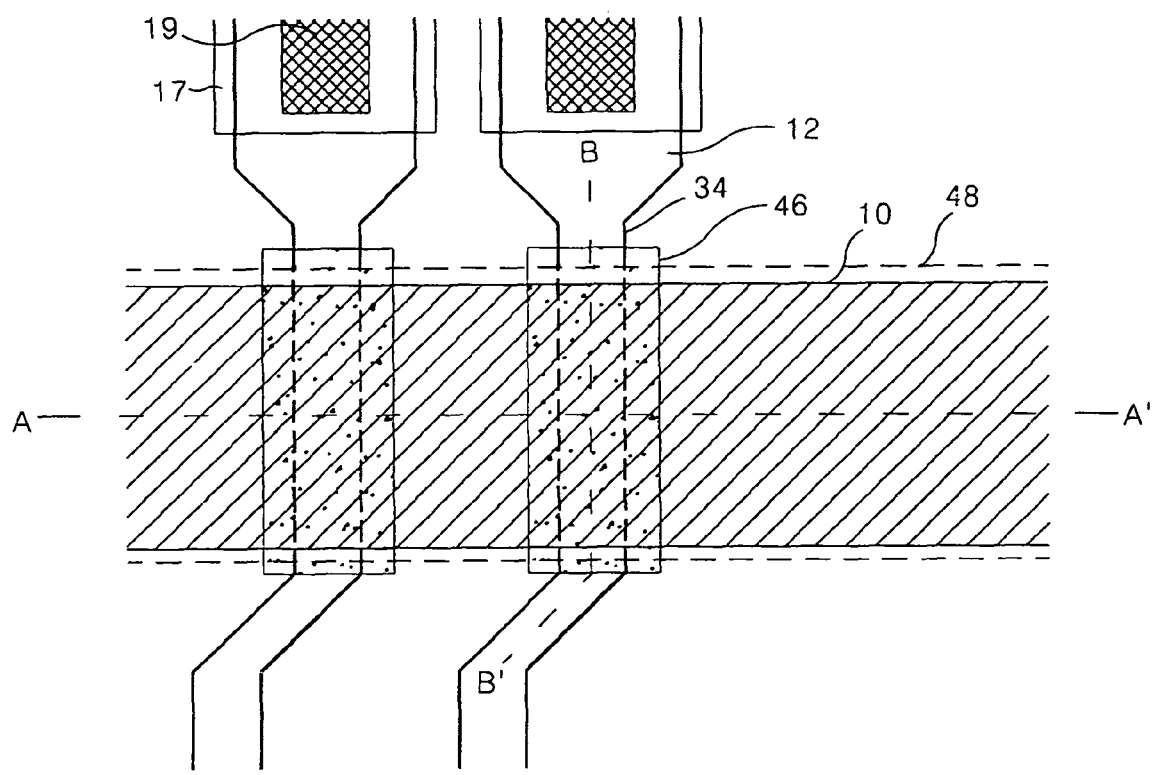
FIG. 11 is a partially enlarged plan view of a gate link of a liquid crystal display according to a second embodiment of the present invention.

FIG. 11 is a partially enlarged view of a gate link of the liquid crystal display according to a second embodiment of the present invention. In FIG. 11, the gate link 34 is formed along with a gate pad 12 and a gate line of a picture display part. The gate pad 12 is electrically connected, via a contact hole 19 formed by way of the gate insulating film and the organic protective film, to a transparent electrode 17. A semiconductor pattern 46 for protecting the gate link 34 is formed on the gate link 34 crossing with a seal 10. The gate insulating film, except for an organic protective film positioned at the seal 10 and a portion formed with the semiconductor pattern 46, is etched to thereby adhere the sealant to the semiconductor pattern 46 and the lower glass. In this case, as an area at which a sealant is adhered to the lower glass becomes more enlarged, the adhesion between the sealant and the lower plate is strengthened. Particularly, a width of the area 48 at which the organic protective film and the gate insulating film are etched, is set to be larger than that of the seal 10, thereby preventing a bubble from being generated at the time of coating the sealant. A section of the lower plate in which the seal 10 is taken along line A-A' in FIG. 11 has the same structure as that in FIG. 10, if the data link is replaced by the gate link.

Figure 12:
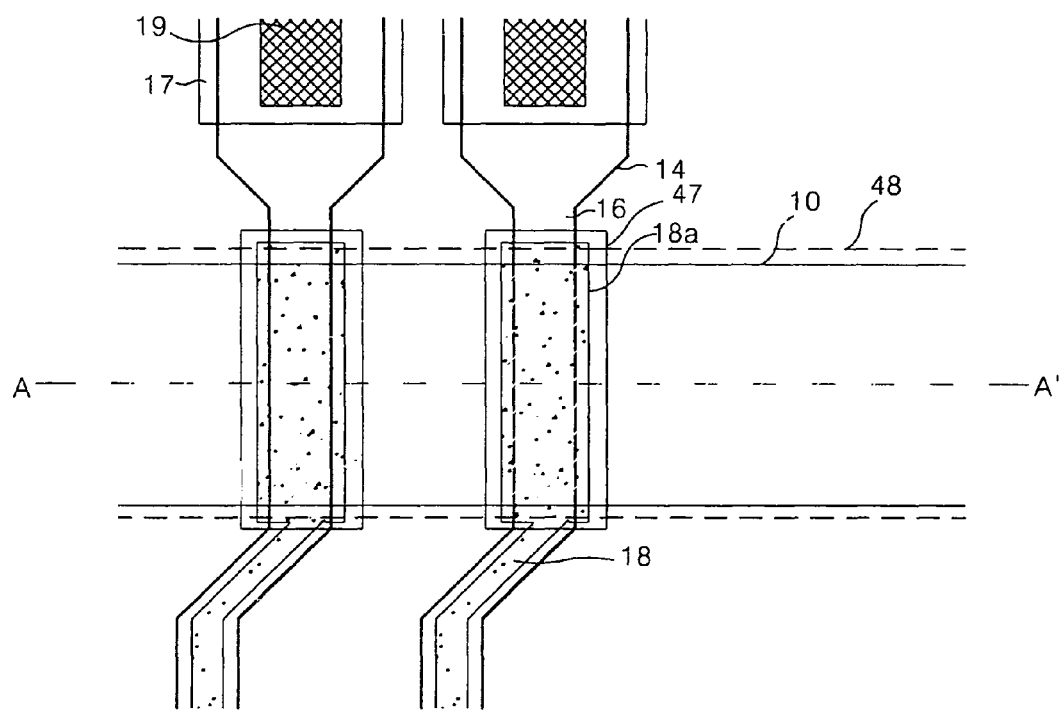
FIG. 12 is a partially enlarged plan view of a data link of a liquid crystal display according to a third embodiment of the present invention.

FIG. 12 is a partially enlarged view of a data link of a liquid crystal display according to a third embodiment of the present invention. In FIG. 12, a data pad 14 and a data link 16 are formed simultaneously with a data line of a picture display part. The data link 16 is electrically connected, via a contact hole 19 formed by way of an organic protective film, to a transparent electrode 17. A semiconductor pattern 18 is formed under the data link 16. A portion 18*a* positioned at the seal 10 in the semiconductor pattern 18 acts as an etch stopper at the time of etching a gate insulating film, thereby preventing the gate insulating film under the semiconductor pattern 18*a* from being undercut. To this end, a width of the semiconductor pattern 18*a* positioned at the seal 10 is set to be wider than the other portion thereof. The gate insulating film except for the organic protective film in the seal 10 and the semiconductor pattern 18*a* are etched. A transparent electrode 47 for protecting the data link 16 is positioned at the upper portion of the data link 16. The transparent electrode 47 has a stronger adhesion to the sealant 11 than to the data link 16. Accordingly, as the sealant 11 contacts the transparent electrode 47 and the lower glass directly, an adhesion between the sealant 11 and the lower plate is more strengthened. Particularly, a width of the etched portion 48 is set to be larger than that of the seal 10, thereby preventing a bubble from being generated at the time of coating the sealant.

Figure 13:
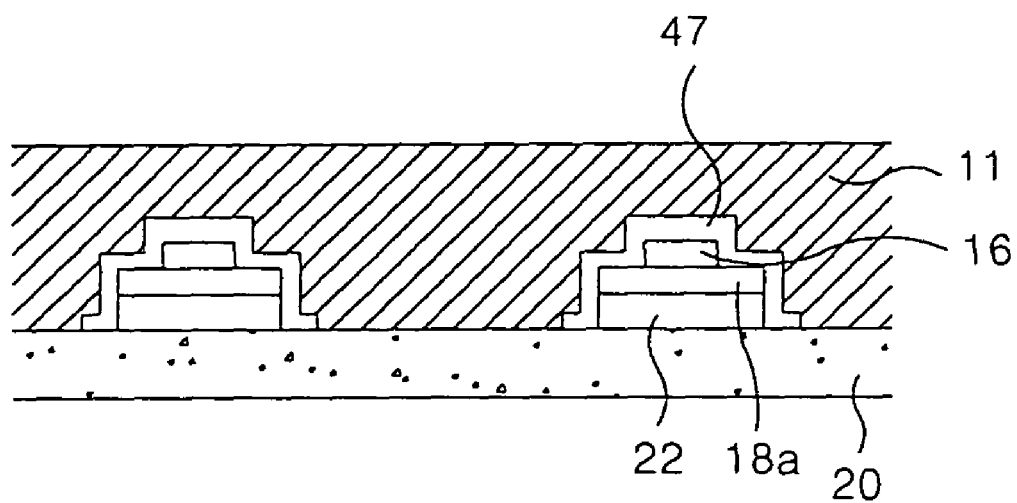
FIG. 13 is a section view of the lower plate and the seal taken along line A-A' in FIG. 12.

FIG. 13 shows a section of the lower plate in which the seal 10 crossing with the data link 16 is taken along line A-A' in FIG. 12. A method of fabricating a data link according to a third embodiment of the present invention will be described with reference to FIG. 13 below. A gate insulating layer 22 is entirely coated on a lower glass 20 formed with the gate line. A semiconductor pattern 18*a* in the seal 10 acts as an etch stopper in a process of etching the gate insulating film 22 later. A width of the semiconductor pattern 18*a* is set to be wider than that of the other portion so as to prevent the gate insulating layer 22 under it from being undercut. After the data link 16 was formed, along with the data line and the data pad, on the semiconductor pattern 18*a*, an organic protective film is entirely coated thereon. Then, the gate insulating layer 22 except for the organic protective film in the seal 10 and the semiconductor pattern 18*a* is etched out using a mask pattern. Subsequently, after the transparent electrode 47 is formed in such a manner as to enclose the data link 16, the semiconductor pattern 18*a* and the gate insulating film 22, the seal 10 is coated with the sealant 11 to adhere the lower plate to the upper plate. Accordingly, the sealant 11 is adhered to the lower glass 20 and the transparent electrode 47, thereby strengthening the adhesion between the sealant 11 and the lower plate.

Figure 14:
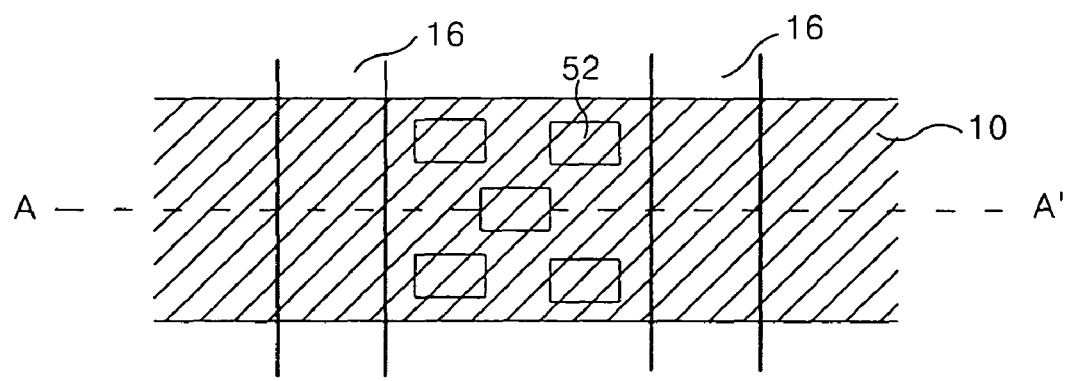
FIG. 14 is a partially enlarged plan view of a data link of a liquid crystal display according to a fourth embodiment of the present invention.
Figure 15:
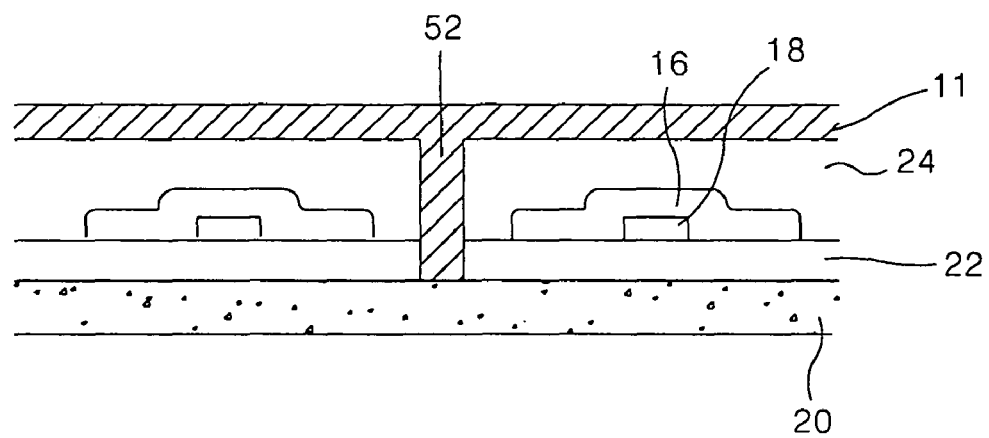
FIG. 15 is a section view of the lower plate and the seal taken along line A-A' in FIG. 14.

FIG. 14 is an enlarged view of a data link in a liquid crystal display according to a fourth embodiment of the present invention. FIG. 15 shows a section of the lower plate in which the seal 10 is taken along line A-A' in FIG. 14. Referring to FIG. 14 and FIG. 15, a number of holes 52 are defined at an organic protective film 24 and a gate insulating film 22 between data links 16 crossing with the seal 10 in such a manner that a sealant 11 comes in contact with the lower glass 20 directly through the number of holes 52 to strengthen the adhesion therebetween. The data link 16 is formed on the lower glass 20 with the gate insulating layer 22, along with the data pad and the data lines. A semiconductor pattern 18 is formed at the lower portion of the data link 16. The organic protective film 24 is entirely coated on the lower plate formed with the data link 16. The number of holes 52 are formed by patterning the organic protective film 24 and the gate insulating film 22 between the data links 16 crossing with the seal 10. Accordingly, when a sealant 22 is coated on the organic protective film 24, it comes into contact with the lower glass 20 directly through the holes 52 to strengthen the adhesion therebetween. In a similar manner, a number of holes 52 are defined at the organic protective film and the gate insulating film between gate links crossing with the seal 10 to strengthen the adhesion between the sealant 11 and the lower plate.

Figure 16:
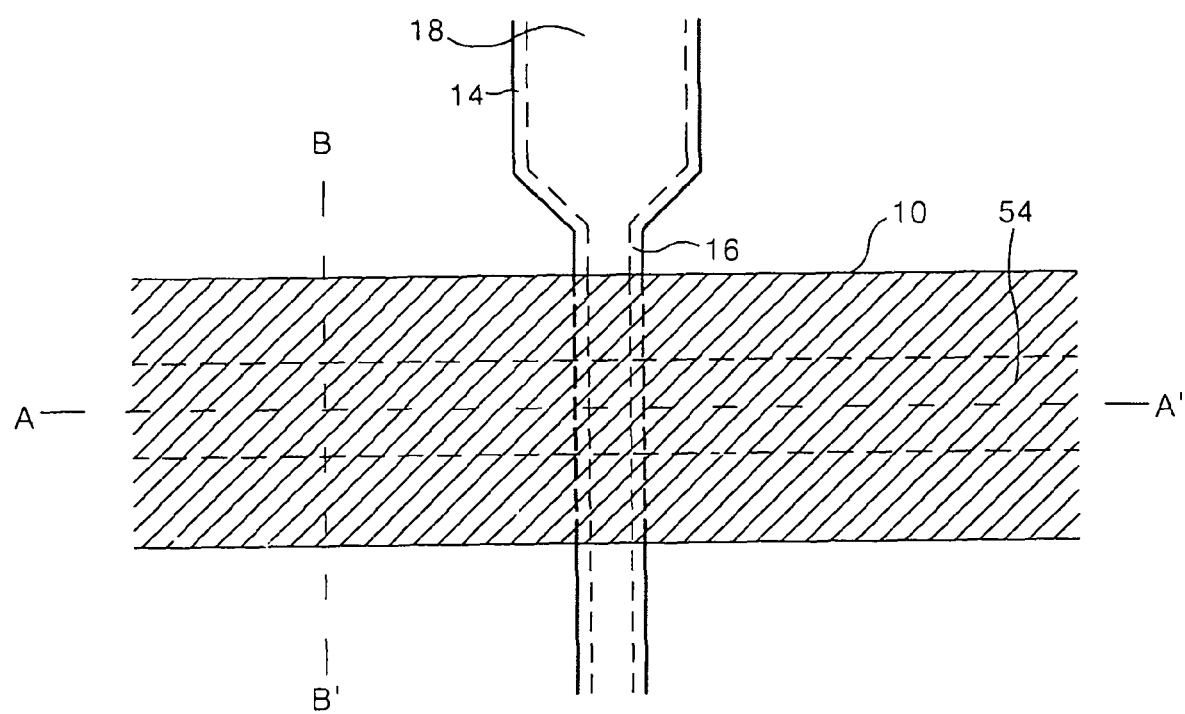
FIG. 16 is a partially enlarged plan view of a data link of a liquid crystal display according to a fifth embodiment of the present invention.
Figure 17A:
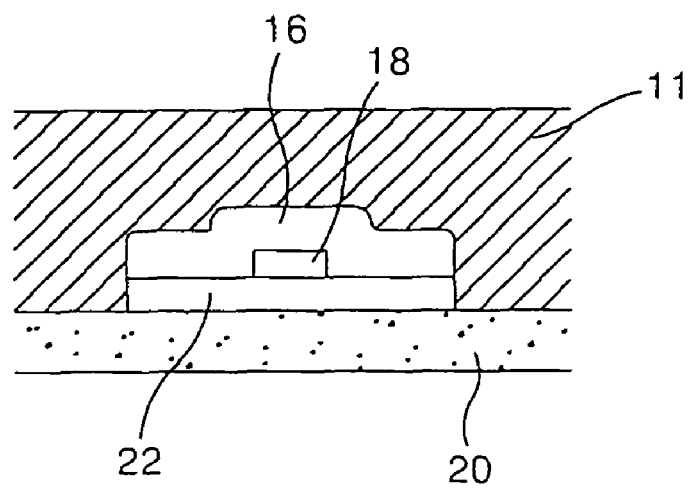
FIG. 17A and FIG. 17B are section views of the lower plate and the seal taken along lines A-A' and B-B' in FIG. 15, respectively.
Figure 17B:
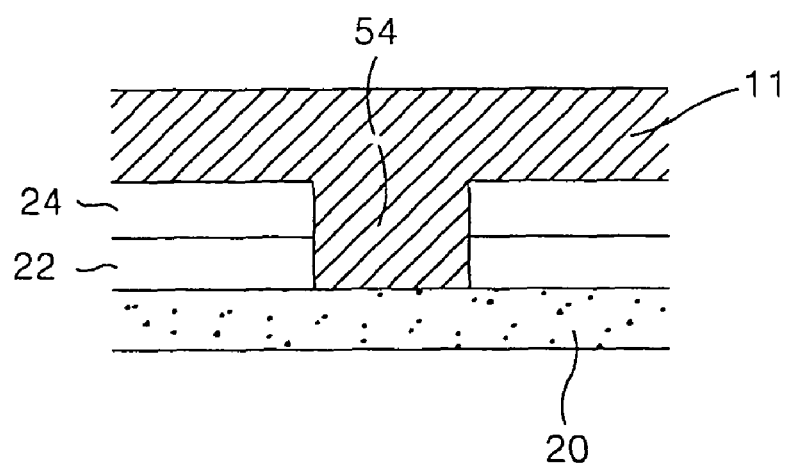

FIG. 16 is an enlarged view of a data link in a liquid crystal display according to a fifth embodiment of the present invention. FIG. 17A and FIG. 17B show sections of the lower plate in which the seal 10 is taken along line A-A' and line B-B' in FIG. 16, respectively. Referring to FIG. 16 and FIGS. 17A and 17B, a line-shaped hole 54 is defined at an organic protective film 24 and a gate insulating film 22 in a direction crossing a data link 16 in such a manner that a sealant 11 comes in contact with the lower glass 20 directly through the line-shaped hole 54 to strengthen the adhesion therebetween. The data link 16 is formed on the lower glass 20 with the gate insulating layer 22, along with the data pad and the data lines. A semiconductor pattern 18 is formed at the lower portion of the data link 16. The organic protective film 24 is entirely coated on the lower plate formed with the data link 16. The line-shaped hole 54 is formed by patterning the organic protective film 24 and the gate insulating film 22 in a direction crossing the data links 16. Accordingly, when a sealant 11 is coated, it comes into contact with the lower glass 20 directly through the line-shaped hole 54 to strengthen the adhesion between the sealant 11 and the lower plate. In a similar manner, a line-shaped hole 54 is defined in the organic protective film and the gate insulating film between gate links crossing with the seal 10 to strengthen an adhesion between the sealant 11 and the lower plate.

Figure 18:
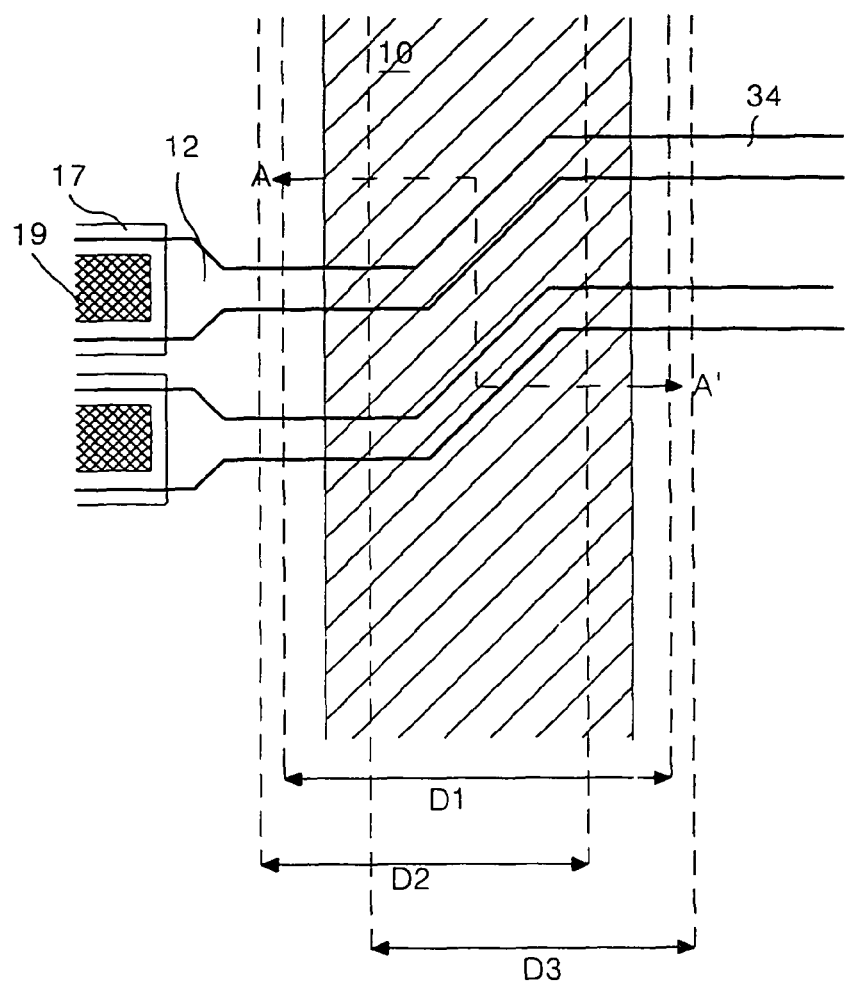
FIG. 18 is a partially enlarged plan view of a gate link of a liquid crystal display according to a sixth embodiment of the present invention.
Figure 19:
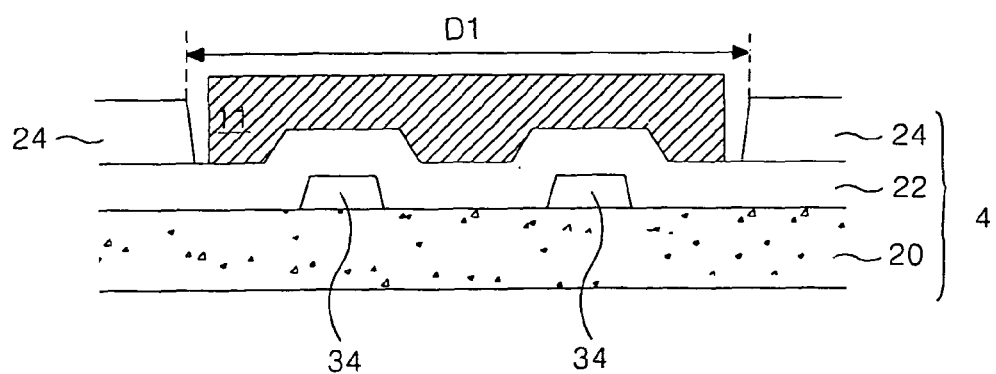
FIG. 19 is a section view of the lower plate and the seal taken along line A-A' in FIG. 18.

FIG. 18 is an enlarged view of a portion of a gate link of a liquid crystal display according to a sixth embodiment of the present invention. In FIG. 18, the gate link 34 is integral to a gate pad 12 and a gate line. The gate pad 12 is electrically connected, via a contact hole 19, formed by way of a gate insulating film and an organic protective film, to a transparent electrode 17. An organic protective film in a seal area 10 is formed in a direction crossing the gate link 34, thereby entirely or partially contacting the sealant with the gate insulating film positioned at the lower portion of the organic protective film. Particularly, an area in which the organic protective film has been removed is arranged like first to third etched areas D1 to D3 shown in FIG. 18 in such a manner that each side or one side thereof is located beyond the line width of the seal 10. In this case, air is evacuated through a space between the sealant 11 and the organic protective film 24 as shown in FIG. 19, thereby preventing a bubble from being generated at the time of coating the sealant. When the area at which the organic protective film has been removed is set to be wider than the line width of the seal 10, like the first etched area D1 shown in FIG. 18, the entire sealant contacts the gate insulating film. When one side of the area removed with the organic protective film is set to be located beyond the seal 10, like the second and third etched areas D2 and D3, the sealant partially contacts the gate insulating film.

FIG. 19 shows a section of the lower plate in which the seal 10 is taken along line A-A' in FIG. 18. A method of fabricating the gate link according to the present invention will be described with reference to FIG. 19 below. The gate link 34 is formed on the lower glass 20, and a gate insulating layer 22 is formed on the entire surface thereof. After an organic protective film 24 was formed on the entire surface of the gate insulating layer 22, the organic protective film 24 at a position to be coated with the sealant 11 is etched out using a mask pattern. In this case, each side or one side of the etched area in the organic protective film 24 is located beyond the line width of a seal coated with the sealant. Then, the seal 10 is coated with the sealant 11 to adhere the lower plate to the upper plate. In this case, the sealant 11 contacts the gate insulating film 22 made from an inorganic material, thereby strengthening the adhesion between the sealant 11 and the lower plate.

Figure 20:
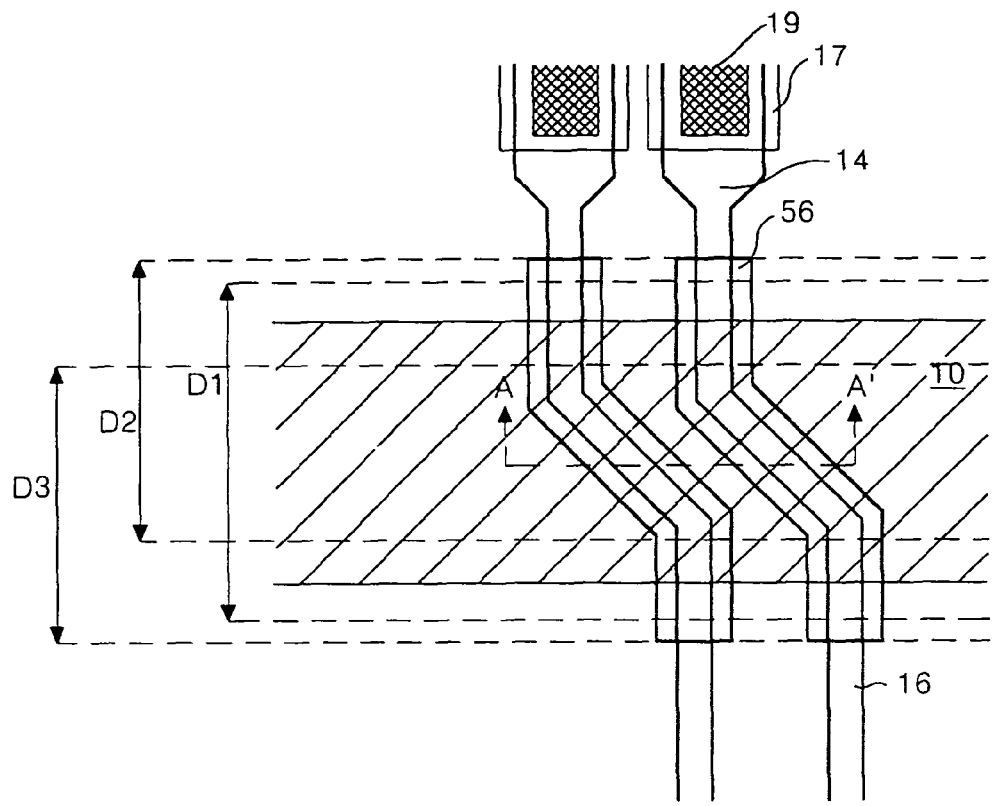
FIG. 20 is a partially enlarged plan view of a data link of a liquid crystal display according to a sixth embodiment of the present invention.

FIG. 20 is a partially enlarged view of a data link of a liquid crystal display according to a sixth embodiment of the present invention. In FIG. 20, the data link 16 is integral to a data pad 14 and a data line. The data pad 14 is electrically connected, via a contact hole 19 defined in the organic protective film, to a transparent electrode 17. An organic protective film in a seal area 10 formed in a direction crossing the data link 16, thereby entirely or partially contacting a sealant with the gate insulating film. In this case, a transparent electrode 56 that protects the data link 16 and has a good adhesion to the sealant is further provided at the upper portion of the data link 16. In order to prevent generation of a bubble at the time of coating the sealant, an area at which an organic protective film is removed is set such that each side or one side thereof is located beyond the line width of the seal 10, like first to third etched areas D1 to D3 shown in FIG. 20.

Figure 21:
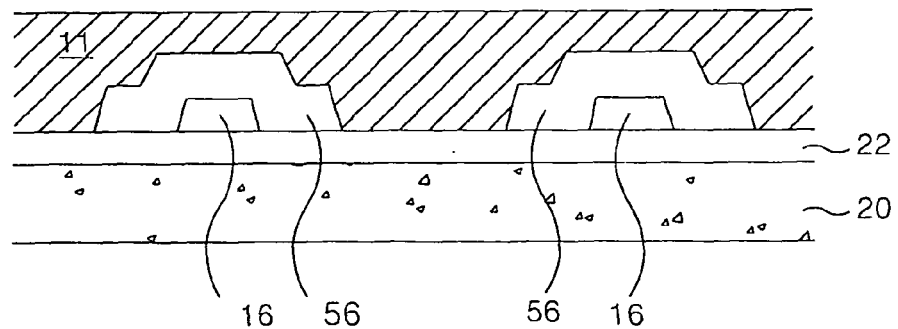
FIG. 21 is a section view of the lower plate and the seal taken along line A-A' in FIG. 20.

FIG. 21 shows a section of the lower plate in which the seal 10 is taken along line A-A' in FIG. 20. A method of fabricating the data link according to the present invention will be described with reference to FIG. 20 below. A gate insulating layer 22 is formed on the entire surface of a lower glass 20. After the data link 16 is formed on the gate insulating layer 22, an organic protective film 24 is formed on the entire surface thereof. Then, the organic protective film 24 at a position to be coated with a sealant 11 is etched out using a mask pattern. In this case, each side or one side of the etched area in the organic protective film 24 is located beyond the line width of a seal coated with the sealant. Subsequently, a transparent electrode 56 is formed at the upper portion of the data link 16 exposed by an etching of the organic protective film. Then, the seal 10 is coated with the sealant 11 to adhere the lower plate to the upper plate. In this case, the sealant 11 contacts the gate insulating film 22 and the transparent electrode 56, thereby strengthening the adhesion between the sealant 11 and the lower plate.

Figure 22:
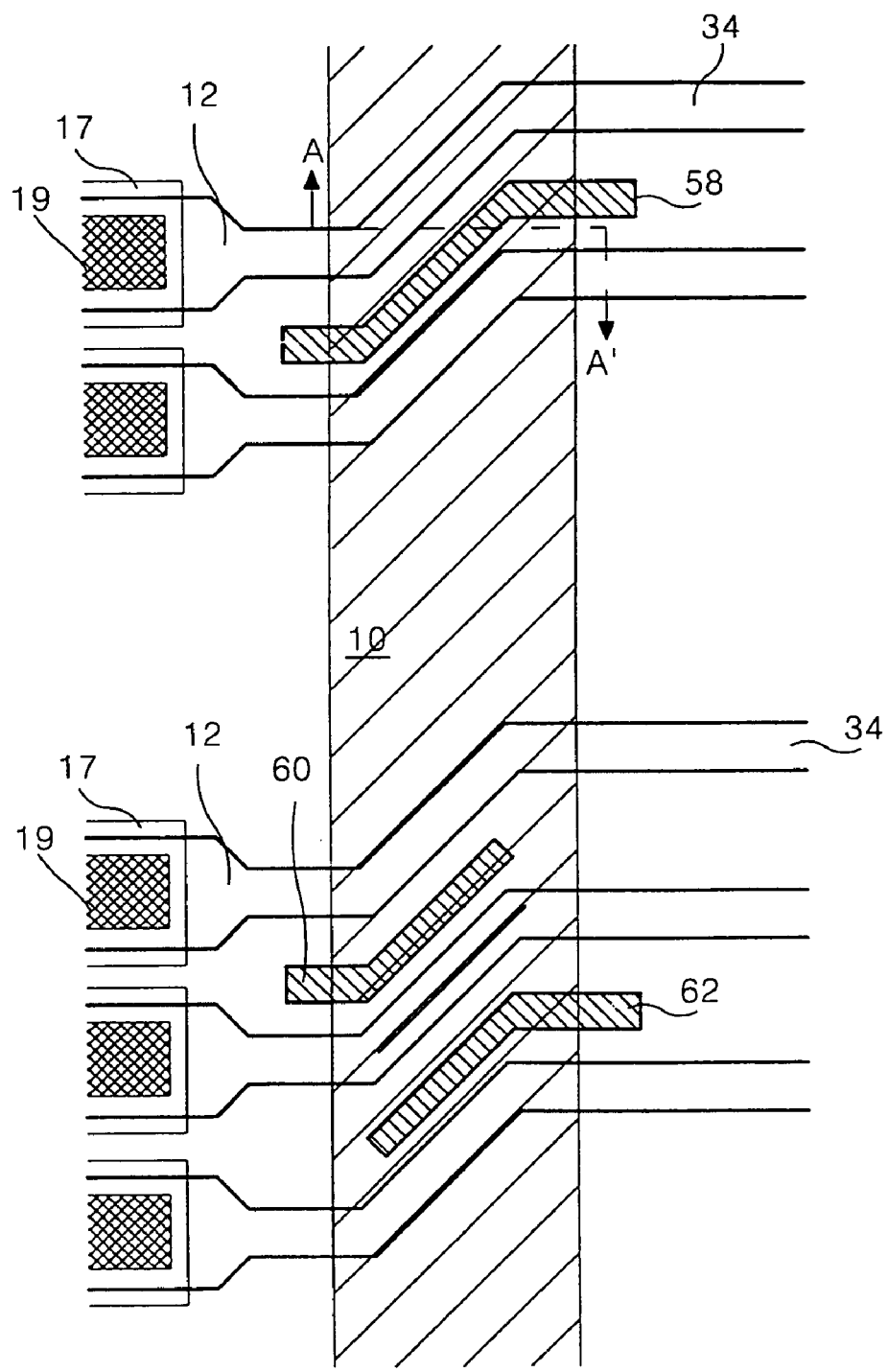
FIG. 22 is a partially enlarged plan view of a gate link of a liquid crystal display according to a seventh embodiment of the present invention.

FIG. 22 is an enlarged view of a portion of a gate link of a liquid crystal display according to a seventh embodiment of the present invention. In FIG. 22, an organic protective film in a seal area 10 provided in a direction crossing the gate link 34 is partially removed, thereby allowing a sealant to partially contact a gate insulating film positioned at the lower part of the organic protective film. In this case, line-shaped holes 58, 60 and 62 parallel to the gate link 34 are defined at the organic protective film between the gate links 34. Particularly, in order to prevent generation of a bubble at the time of coating a sealant, each end or one end of the line hole is extended beyond the seal 10. More specifically, each end of the line-shape hole is extended beyond the seal 10 like the first line-shaped hole 58, or one end of the line-shape hole is extended beyond the seal 10 like the second or third line-shaped hole 60 or 62.

Figure 23:
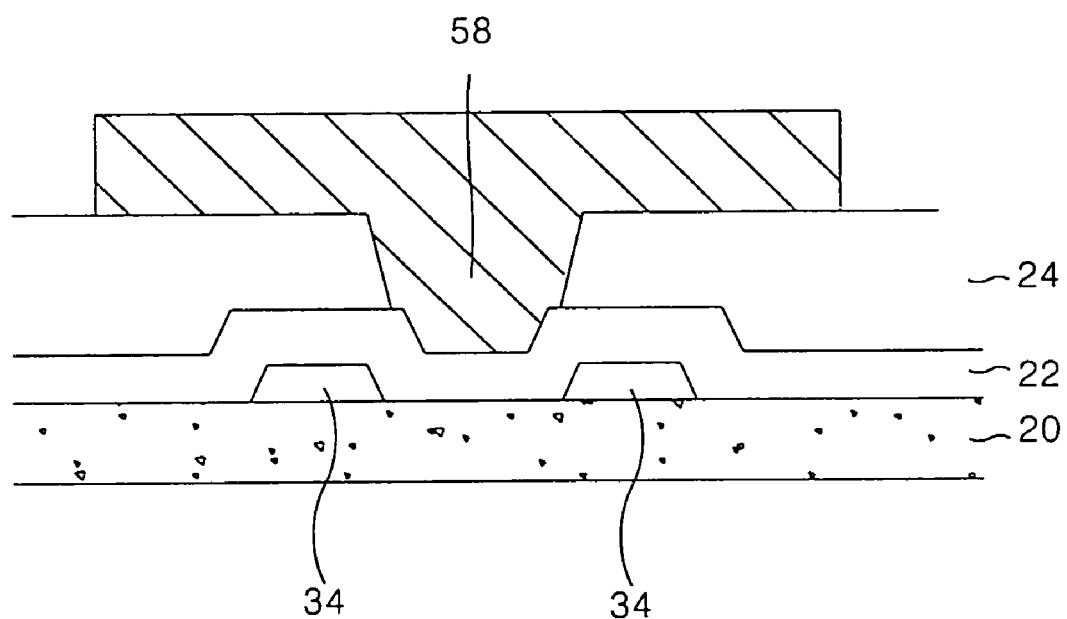
FIG. 23 is a section view of the lower plate and the seal taken along line A-A' in FIG. 22.

FIG. 23 shows a vertical section of the lower plate in which the seal 10 is taken along a horizontal line A-A' in FIG. 22. A method of fabricating the gate link according to the present invention will be described with reference to FIG. 23 below. The gate link 34 is formed on the lower glass 20, and a gate insulating layer 22 is formed on the entire surface thereof. After an organic protective film 24 was formed on the entire surface of the gate insulating layer 22, the organic protective film 24 at a position to be coated with a sealant 11 is partially etched out using a mask pattern. In other words, the line-shaped holes 58, 60 and 62 are defined at the organic protective film 24 between the gate links 34. In this case, each side or one side of the line-shaped holes 58, 60 and 62 is located beyond the seal 10. Then, the seal 10 is coated with the sealant 11 to adhere the lower plate to the upper plate. Accordingly, the sealant 11 partially contacts the gate insulating film 22, thereby strengthening the adhesion between the sealant 11 and the lower plate.

Figure 24:
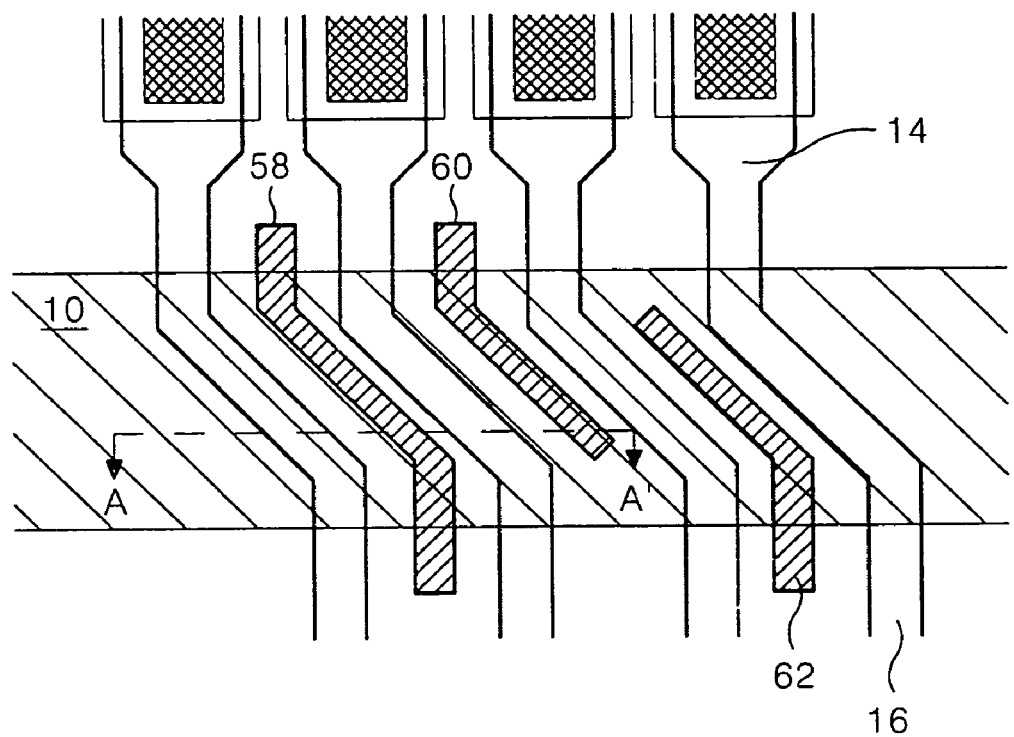
FIG. 24 is a partially enlarged plan view of a data link of a liquid crystal display according to a seventh embodiment of the present invention.

FIG. 24 is a partially enlarged view of a data link of a liquid crystal display according to a seventh embodiment of the present invention. In FIG. 24, an organic protective film in a seal area 10 provided in a direction crossing the data link 16 is partially removed, thereby allowing the sealant to partially contact a gate insulating film positioned at the lower part of the organic protective film. In this case, line-shaped holes 58, 60 and 62 parallel to the data link 16 are defined in the organic protective film between the data links 16. Particularly, in order to prevent generation of a bubble at the time of coating a sealant, each end or one end of the line hole is extended beyond the seal 10. More specifically, each end of the line-shape hole is extended beyond the seal 10 like the first line-shaped hole 58, or one end of the line-shape hole is extended beyond the seal 10 like the second or third line-shaped hole 60 or 62.

Figure 25:
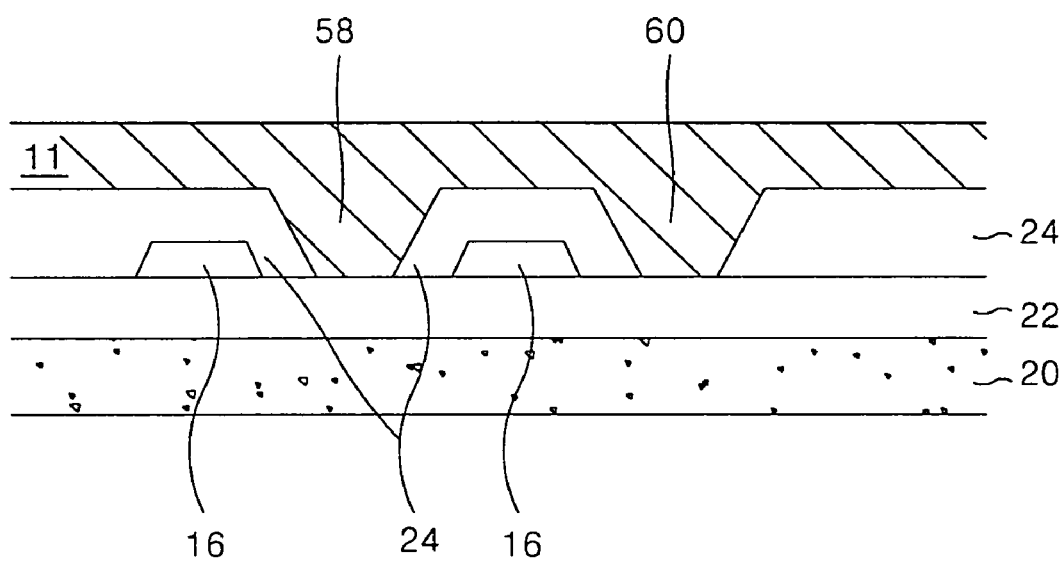
FIG. 25 is a section view of the lower plate and the seal taken along line A-A' in FIG. 24.

FIG. 25 shows a section of the lower plate in which the seal 10 is taken along line A-A' in FIG. 24. A method of fabricating the data link according to the present invention will be described with reference to FIG. 25 below. A gate insulating layer 22 is formed on the entire surface of a lower glass 20.

After the data link 16 is formed on the gate insulating layer 22, an organic protective film 24 is formed on the entire surface thereof. Then, the organic protective film 24 at a position to be coated with a sealant 11 is etched out using a mask pattern. In other words, a line-shaped hole is defined in the organic protective film 24 between the data links 16. In this case, each side or one side of the line-shaped holes 58, 60 and 62 is extended beyond the seal 10. Then, the seal 10 is coated with the sealant 11 to adhere the lower plate to the upper plate. In this case, the sealant 11 partially contacts the gate insulating film 22, thereby strengthening the adhesion between the sealant 11 and the lower plate.

As described above, in the liquid crystal display and the fabricating method thereof according to the present invention, an organic protective film and a gate insulating film at an area coated with a sealant are partially or entirely removed in such a manner that the sealant comes into contact with a glass substrate directly, thereby strengthening an adhesion between the sealant and the lower plate. Also, an organic protective film at an area coated with a sealant is partially or entirely removed to contact the sealant with the gate insulating film, thereby strengthening the adhesion between the sealant and the lower plate. Accordingly, the liquid crystal display with a high aperture ratio to which the organic protective film is applied can prevent leakage of liquid crystal caused by an external impact due to a weakened adhesion between the sealant and the organic protective film or between the organic protective film and the gate insulating film.

It will be apparent to those skilled in the art that various modifications and variations can be made in the liquid crystal display and the fabrication method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate;
      an electrode line;
      an electrode pad;
      an electrode link connecting the electrode line and the electrode pad;
   a sealant crossing the electrode link between the electrode line and the electrode pad;
   an organic protective film and a gate insulating film formed on the substrate and patterned such that the sealant directly contacts the substrate,
   a second electrode line;
   a second electrode pad; and
   a second electrode link connecting the second electrode line and the second electrode pad,
   wherein at least one hole is defined in the organic protective film and the gate insulating film between the electrode links,
   wherein said organic protective film and said gate insulating film are etched in a continuous groove extending along a direction in which the sealant is formed,
   wherein said organic protective film and said gate insulating film are etched more widely than said area coated with the sealant, such that a width of said groove transverse to a direction in which the sealant is formed is greater than a width of an area in which the sealant is formed, and
   wherein each of the electrode links is stacked with the patterns of the gate insulating film and the organic protective film.

2. The liquid crystal display as claimed in claim 1, wherein said hole extends beyond an area coated with the sealant.

3. The liquid crystal display as claimed in claim 1, further comprising: a protective layer for preventing the electrode link from directly contacting the sealant.

4. The liquid crystal display as claimed in claim 3, wherein the electrode link is a gate link, and further comprising a data link made from the same electrode material as the gate link, and wherein said protective layer is a semiconductor pattern formed on the gate insulating film.

5. The liquid crystal display as claimed in claim 3, wherein, the electrode link is a data link and said protective layer is a transparent electrode coated to enclose the data link, a semiconductor pattern, and the gate insulating film.

6. The liquid crystal display as claimed in claim 5, wherein a width of the semiconductor pattern is greater than a width of the data link.

7. A method of fabricating a liquid crystal display,
   comprising a substrate, an electrode line, an electrode pad, an electrode link connecting the electrode line and the electrode pad, a sealant crossing the electrode link between the electrode line and the electrode pad, and an organic protective film and a gate insulating film formed on the substrate, the method comprising:
   patterning the organic protective film and the gate insulating film in an area coated with the sealant such that the sealant directly contacts the substrate, wherein said patterning includes providing a groove in the organic protective film and the gate insulating film, said groove extending along a direction in which the sealant is formed,
   wherein the liquid crystal display further comprises a second electrode line, a second electrode pad, and a second electrode link connecting the second electrode line and the second electrode pad, and wherein patterning the organic protective film and the gate insulating film includes defining at least one hole at the organic protective film and the gate insulating film between the electrode links,
   wherein said organic protective film and said gate insulating film are etched more widely than said area coated with the sealant, and
   wherein each of the electrode links is stacked with the patterns of the gate insulating film and the organic protective film.

8. The method as claimed in claim 7, wherein said hole extends beyond an area coated with the sealant.

9. The method as claimed in claim 7, further comprising:
   forming a protective layer for preventing the electrode link from directly contacting the sealant.

10. The method as claimed in claim 9, wherein the electrode link is a gate link, and wherein said liquid crystal display device further comprises a data link made from the same electrode material as the gate link, and wherein said forming of the protective layer includes providing a semiconductor pattern formed on the gate insulating film.

11. The method as claimed in claim 9, wherein, when the electrode link is a data link, said forming of the protective layer includes coating a transparent electrode to enclose the data link, a semiconductor pattern, and the gate insulating film.

12. The method as claimed in claim 11, wherein a width of the semiconductor pattern is greater than a width of the data link.

* * * * *